Jan. 24, 1961  E. J. RUSICH  2,968,879
MECHANICAL HARVESTING DEVICE FOR CULTIVATED OR REEF OYSTERS
Filed Jan. 26, 1959  2 Sheets-Sheet 1
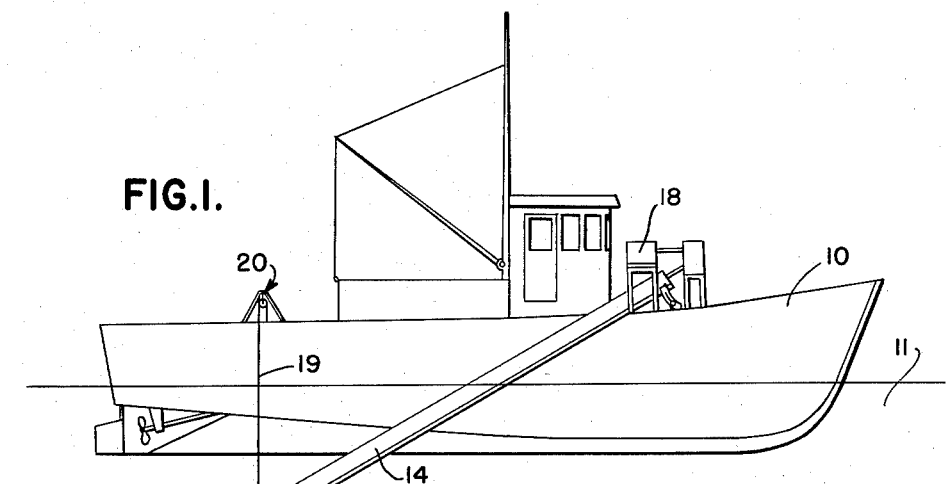
FIG.1.
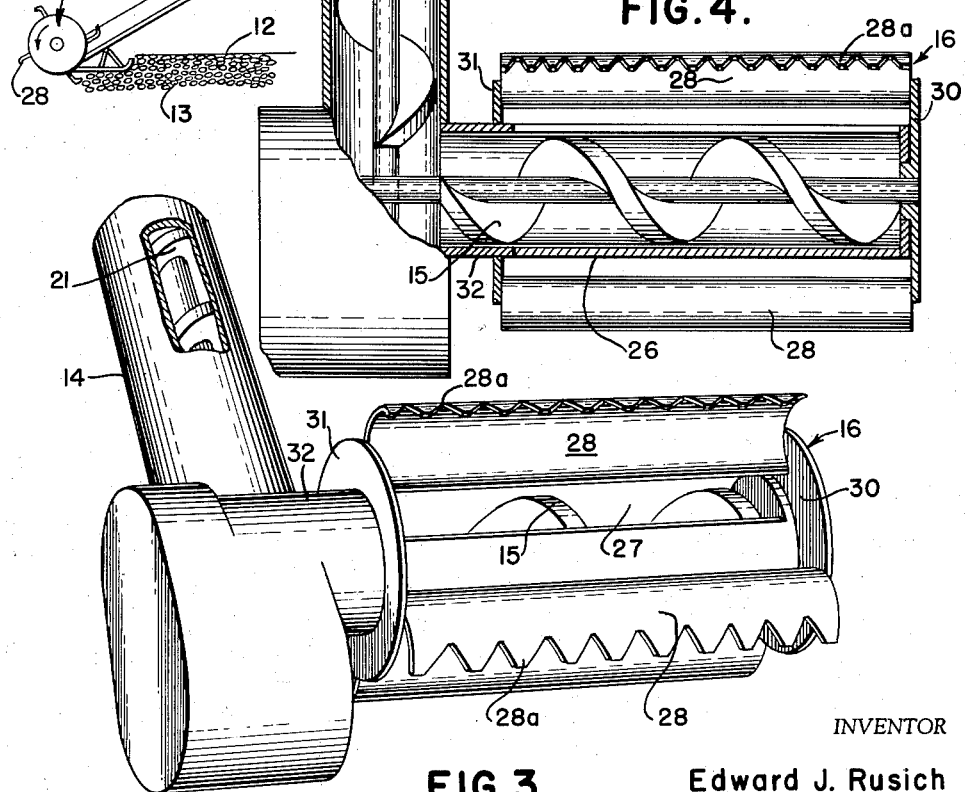
FIG.4.
FIG.3.
INVENTOR
Edward J. Rusich

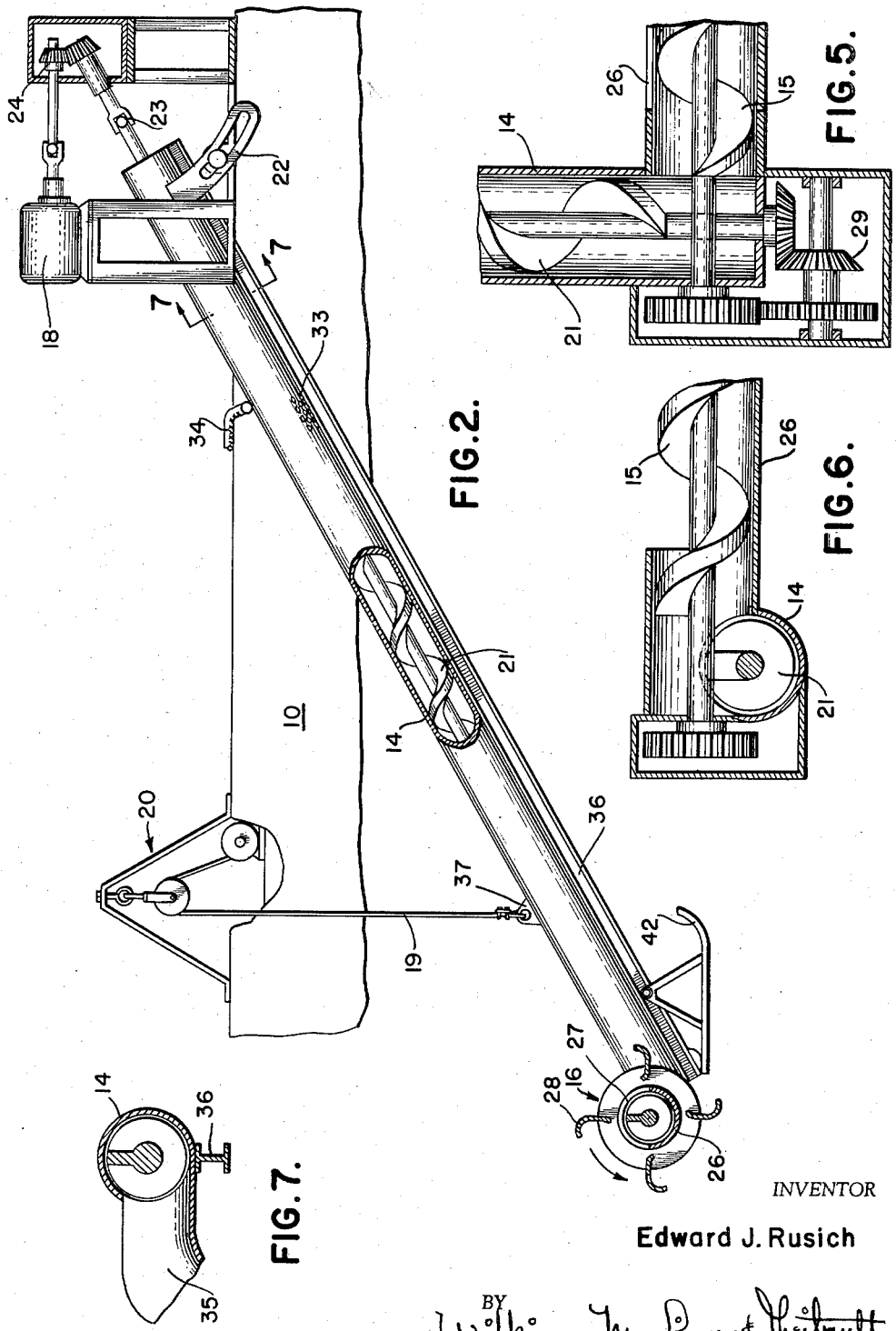

United States Patent Office 2,968,879
Patented Jan. 24, 1961

2,968,879

MECHANICAL HARVESTING DEVICE FOR CULTIVATED OR REEF OYSTERS

Edward J. Rusich, 430 Mehle Ave., Arabi, La.

Filed Jan. 26, 1959, Ser. No. 789,022

6 Claims. (Cl. 37—55)

The present invention relates to a mechanical harvesting device for cultivated or reef oysters, and is a continuation-in-part application of my application, Serial No. 746,057, filed July 1, 1958, now abandoned.

An object of the present invention is to provide a mechanical means for removing oysters from their normal habitat in mud at the bottom of bodies of water and delivering the same to a storage vessel without breaking or injuring the oysters in transferring the same.

A further object of the present invention is to provide a device rugged in construction having few moving parts which is relatively light and easy to handle and which will not require a structural modification of the hull of the vessel with which it is used.

A further object of the present invention is a provision of a mechanical device for elevating oysters from the water bottom without breaking up or otherwise impaling or harming the oyster.

A further object of the present invention is to provide a mechanical harvesting device which is provided with two depth settings, one being a rough and the other a vernier adjustment. The first adjustment means controls the depth or initial lowering of the device from aside the vessel to its contact with the water bottom where oysters are to be harvested. The second adjustment is a vernier adjustment in that a variable depth skid or sled member is employed to regulate the cutting depth of the rake tine members.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view of a fishing vessel equipped with a mechanical oyster harvester constructed in accordance with the present invention;

Figure 2 is a fragmentary side elevational view of Figure 1 taken at an enlarged scale, having parts broken away and parts shown in section;

Figure 3 is a fragmentary perspective view of the raking section of an oyster harvester constructed in accordance with the present invention, having parts broken away and parts shown in section taken at a magnified scale;

Figure 4 is a transverse section taken through the lower end of the mechanical harvester showing the rotary rake and two conveyors of the harvester;

Figure 5 is a fragmentary transverse section of the transverse and longitudinal conveyor portions of the mechanical harvester constructed in accordance with the present invention;

Figure 6 is a fragmentary longitudinal section with parts broken away and parts shown in section, taken at a magnified scale of the mechanical harvester constructed in accordance with the present invention, and Figure 7 is a transverse section taken on the line 7—7 in Figure 2.

Referring now to Figure 1, 10 designates generally a fishing vessel or the like, the vessel for employing the present invention could be a barge or skiff and need not particularly be a fishing vessel. The vessel 10 is floating in a body of water 11 having a bottom 12 containing oysters 13 to be harvested. The device of the present invention comprises generally a longitudinal conveyor tube 14 and a transverse conveyor tube 26 with a rotary rake 16 having serrated or tine-like digging members 28. The rotary rake and two conveyor screws 21 and 15 in tubes 14 and 26 respectively, are driven from a prime mover 18 mounted on the vessel. The longitudinal conveyor tube 14 is raised and lowered from the vessel by a cable 19 controlled from a winch and boom arrangement 20.

As shown in Figures 2, 3 and 4, the longitudinal conveyor tube 14 is provided with an Archimedes' screw 21. The upper portion of the conveyor tube 14 is provided with a quadrant member 22 for regulating the angle of the longitudinal conveyor tube 14 with respect to the vessel. The Archimedes' screw 21 is driven through a universal 23 and bevel gearing arrangement 24, these units being powered by the prime mover 18 which may be either a gasoline engine, electric motor or some other suitable source of rotary motive power.

The transverse conveyor tube 26, as best seen in Figure 4, includes the transversely disposed Archimedes' screw 15 therein. The upper portion of the tube member 26 is cut open, as best seen in Figure 3, at 27 to permit the rotary tines or digging members 28 to drop the oysters dug from the water bottom into the transverse Archimedes' screw conveyor where they are conveyed to the left, as shown in Figure 4. It will be noted that the two Archimedes' screws 15 and 21 are connected to be driven together by appropriate gearing 29. This permits the chain of mechanical movement to go, as shown in Figures 2 and 4, from the prime mover 18, through the gearing 24, universal 23, Archimedes' screw 21, through the gearing 29 to drive the Archimedes' screw 15 which in turn drives an end plate 30 of the rotary rake member 16. The rotary rake member has two plate members, the first being the member 30 secured to the outermost end of the Archimedes' screw 15 for rotation therewith and the second being a collar-like plate 31 which rides about a collar portion 32 at the inner end of the tube member 26. Upon rotation of the Archimedes' screw 21, the transverse conveyor Archimedes' screw 15 rotates causing the rotary rake device to turn and impale the teeth into the mud or bottom to extricate oysters therefrom.

Oysters, by gravity, having been scooped up by the concave digging members 28 will drop into the slotted opening 27 of the tube 26 where the Archimedes' screw will convey these oysters over to a point where they will be conveyed by the longitudinal conveying screw 21 and elevated to the surface. As the oysters approach the gunnel of the vessel it will be noted that a portion of the tube 14 is foraminous, as shown at 33, to permit wash water introduced at 34 to remove mud, slit and the like from the oysters. The then cleaned oysters will then be shifted to the side and discharged through a chute 35 onto a suitable grading or other classifying device on the vessel.

The longitudinal tube 14 has secured therebeneath an I-beam 36, as best seen in Figures 2 and 7, for added strength. At the top of the tube 14 there is a pad eye 37 which receives the cable 19 from the winch and boom arrangement 20 on the vessel.

The I-beam 36 also has pivoted thereto and adjustable therewith a mud ski or sled 42 which will control the depth of penetration of the rotary cutting or digging members 28. This sled member may be adjusted vertically with respect to the rotary axis of the Archimedes' screw 15 of the transverse conveyor. This will of course be to compensate for harvesting operations in varying kinds of silt or mud.

Of particular importance in connection with the present invention is the construction of the rotary digging members 28. These members are concave in construction and are provided with cutting teeth or serrated edges 28$^a$ to facilitate digging in the mud and encountering and elevating oysters. The concave construction of the rotary digging members permits of a chute-like drop so that upon elevation of these members as the members rotate in a counterclockwise direction with respect to Figure 2, the effect of gravity on the oyster will cause the oyster to ride down the concave surface of the digging member 28 and enter between the flights of the transverse Archimedes' screw 15 where they are conveyed transversely over to the longitudinal conveying screw 21 from whence they are elevated to the surface.

It will be noted from Figures 2 and 6 that the transverse conveyor dumps the oysters from above down to a lower point where they are picked up by the longitudinal conveyor screw 21 to be elevated. It is preferable that these two elevators or screws not be introduced at the same plane. A dropping action assures motion on the part of the oyster and will permit the oyster to be elevated in a positive manner without build-up or clogging of the longitudinal conveyor.

Although I have disclosed herein the best form of the invention known to me at this time, I reserve the right to all such modifications and changes as may come within the scope of the following claims.

What I claim is:

1. An oyster harvester for ready installation on the hull of a vessel comprising an elongated tube having a screw conveyor journaled longitudinally therein, mounting means on said tube for positioning it on the hull of a vessel, power means connected to said screw conveyor for rotating the same about its longitudinal axis, a second elongated tube in angular communicating relation to said first mentioned tube, a second screw conveyor journaled in said second tube and having an axis of rotation in spaced intersecting relation to the longitudinal axis of said first screw conveyor, said screw conveyors being drivingly connected, said second elongated tube including upwardly opening slot means, a power driven rake journaled on said second elongated tube and drivingly connected to the screw conveyor therein, said rake including radially disposed elongated digging members in spaced parallel relation to the axis of rotation of the screw conveyor in said second tube for depositing material into said slot means in response to simultaneous rotation of the second screw conveyor by the screw conveyor in said first tube.

2. An oyster harvester as claimed in claim 1 wherein an intermediate portion of said first mentioned tube is foraminous to permit washing foreign matter from the oysters being harvested.

3. An oyster harvester as claimed in claim 1 further comprising a depth control sled carried by the first mentioned tube spaced from said second tube and rake to regulate the raking depth of the rotary rake.

4. The structure of claim 1; said rake comprising a collar journalled on an intermediate portion of said second tube, a plate fixed to the terminal end of said second screw conveyor outwardly of said second tube, said digging members extending between said collar and end plate and including an arcuate cross-section for guiding oysters into the slot means of said tube.

5. The structure of claim 1; said mounting means comprising an arcuately slotted quadrant at one end of said first mentioned elongated tube for vertical securement on a hull, and a cable and winch-and-boom at the other end of said first mentioned tube for adjusting the angular relation thereof with respect to the hull.

6. The structure of claim 1; said first mentioned tube being longitudinally reinforced to prevent excessive bending of said tube.

References Cited in the file of this patent
UNITED STATES PATENTS

| | | |
|---|---|---|
| 1,070,271 | Lybeck | Aug. 12, 1913 |
| 1,318,517 | Warren | Oct. 14, 1919 |
| 2,363,251 | Jurisich | Nov. 21, 1944 |
| 2,646,736 | Swartout | July 28, 1953 |
| 2,857,691 | Curran | Oct. 28, 1958 |